US012585965B2

(12) United States Patent
Vijayaraghavan et al.

(10) Patent No.: US 12,585,965 B2
(45) Date of Patent: Mar. 24, 2026

(54) INTERACTIVE MACHINE-LEARNING FRAMEWORK

(71) Applicant: SAP SE, Walldorf (DE)

(72) Inventors: Krishnan Vijayaraghavan, Bengaluru (IN); Sparshad Kasote, Pune (IN)

(73) Assignee: SAP SE, Walldorf (DE)

( * ) Notice: Subject to any disclaimer, the term of this patent is extended or adjusted under 35 U.S.C. 154(b) by 915 days.

(21) Appl. No.: 17/717,547

(22) Filed: Apr. 11, 2022

(65) Prior Publication Data

US 2023/0325684 A1     Oct. 12, 2023

(51) Int. Cl.
*G06Q 30/0251*     (2023.01)
*G06N 5/022*     (2023.01)
*G06N 5/04*     (2023.01)
G06N 3/04     (2023.01)
G06N 3/08     (2023.01)

(52) U.S. Cl.
CPC .............. *G06N 5/022* (2013.01); *G06N 5/04* (2013.01)

(58) Field of Classification Search
CPC ............ G06N 5/022; G06N 5/01; G06N 5/04; G06N 20/20
See application file for complete search history.

(56) References Cited

U.S. PATENT DOCUMENTS

2020/0389375 A1* 12/2020 Haze ........................ G06F 9/505
2023/0244717 A1* 8/2023 Chundi ................ H04N 21/812
707/736

OTHER PUBLICATIONS

Aurora Harley, "Individualized Recommendations: Users' Expectations & Assumptions", Sep. 30, 2018, https://www.nngroup.com/articles/recommendation-expectations/ (Year: 2018).*
Isinkaye et al., "Recommendation systems: Principles, methods and evaluation", Available online Aug. 20, 2015, Egyptian Informatics Journal (Year: 2015).*
Google, "Manage your recommendations and search results", verified via Wayback Machine saved on Mar. 8, 2022 https://web.archive.org/web/20220308171304/https://support.google.com/youtube/answer/6342839?co=GENIE.Platform%3DAndroid&hl= en (Year: 2022).*
Wen et al., "Exploring Recommendations Under User-Controlled Data Filtering" (hereinafter Wen), RecSys '18, Oct. 2-7, 2018, Vancouver, BC, Canada (Year: 2018).*
Spotify, "Don't recommend stuff I've removed from history" Jun. 22, 2019 12:27 PM accessed in https://community.spotify.com/t5/Accounts/Don-t-recommend-stuff-I-ve-removed-from-history/td-p/4773530 (Year: 2019).*

* cited by examiner

*Primary Examiner* — Kakali Chaki
*Assistant Examiner* — Josep Han
(74) *Attorney, Agent, or Firm* — Buckley, Maschoff & Talwalkar LLC

(57)     ABSTRACT

Systems and methods include receipt, from a machine learning system, of a first output based on a first plurality of activity data associated with a user, presentation of the first output to the user, presentation of the first plurality of activity data to the user, receipt of an instruction from the user to designate a first portion of the first plurality of the activity data as unavailable for generation of output, and, in response to the instruction, designation of the first portion of the first plurality of activity data as unavailable for generation of outputs for the user.

17 Claims, 10 Drawing Sheets

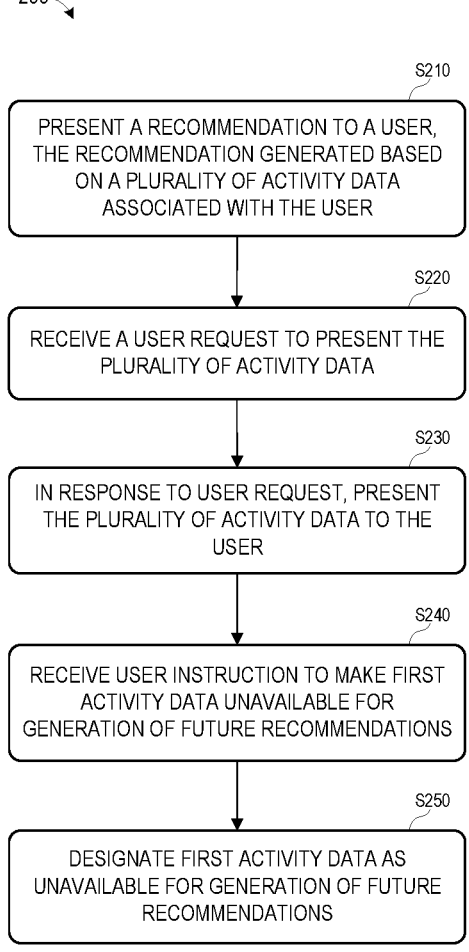

200

S210

PRESENT A RECOMMENDATION TO A USER, THE RECOMMENDATION GENERATED BASED ON A PLURALITY OF ACTIVITY DATA ASSOCIATED WITH THE USER

S220

RECEIVE A USER REQUEST TO PRESENT THE PLURALITY OF ACTIVITY DATA

S230

IN RESPONSE TO USER REQUEST, PRESENT THE PLURALITY OF ACTIVITY DATA TO THE USER

S240

RECEIVE USER INSTRUCTION TO MAKE FIRST ACTIVITY DATA UNAVAILABLE FOR GENERATION OF FUTURE RECOMMENDATIONS

S250

DESIGNATE FIRST ACTIVITY DATA AS UNAVAILABLE FOR GENERATION OF FUTURE RECOMMENDATIONS

Plan For Conquering Mars

Tech Insider. 72K views. 1 day ago

VISIT SITE

VISIT SITE

Rs 488

Rs 429

Stylish Men's Watches Under Rs 500

Checkout from a wide variety of watches under 500

AD Snapdeal (T) —310

Home    Trending    Subscriptions    Index    Library

300

300

INTERACTIVE MACHINE-LEARNING FRAMEWORK

BACKGROUND

Many modern computing systems provide some type of recommendation functionality. Common examples of such systems include online shopping applications, video streaming services and advertisement-delivery networks. In order to determine recommendations for a particular user, these systems apply algorithms to data related to the particular user. User-related data may include demographic data and/or data related to activities which were previously performed by the user (e.g., search history, shopping history, viewing history, and prior recommendation history).

Recommendation algorithms are increasingly implemented using machine learning technology. The accuracy of these algorithms may be increased via the use of larger training data sets and by increasing the number and type of inputs to the algorithms. Both considerations result in the collection and use of large amounts of user-related data by current recommendation systems.

The above approach assumes that all user-related data is correlated to user preferences. Some user activities might be unrelated to their preferences and these activities can create outlier data which decreases the accuracy of recommendations which are generated based thereon. For example, a user may purchase an item for a friend. Even if the user has no interest in the item outside of the context of this sole purchase, a recommendation system may nonetheless use the purchase as an input to generate a recommendation for the user. The recommendation is likely to be less accurate (i.e., of less interest to the user) than a recommendation which was not generated based on the purchase.

Current recommendation systems allow users to provide feedback in response to generated recommendations. Generally, a user presented with a recommendation may indicate the degree to which the recommendation is accurate or relevant to the user. The recommendation system may use this indication to retrain the recommendation algorithm and thereby influence future recommendations.

The current approach fails to address the existence of uncorrelated data, which continues to affect the accuracy the future recommendations irrespective of any received user feedback. The current approach also fails to distinguish between user consent to collect user-related data and user consent to use user-related data for generation of recommendations.

Systems are desired to efficiently manage user-related data which is used to generate recommendations. Such systems may provide improved recommendation accuracy and/or increased user control over their related data.

BRIEF DESCRIPTION OF THE DRAWINGS

FIG. 2 is a flow diagram of a process to manage user-related data associated with a recommendation according to some embodiments.

DETAILED DESCRIPTION

The following description is provided to enable any person in the art to make and use the described embodiments. Various modifications, however, will be readily-apparent to those in the art.

Briefly, some embodiments include presentation of a recommendation to a user. The recommendation may include, for example, one or more products, videos, or songs. A request may then be received from the user for the particular data which used to generate the recommendation. It is assumed that the recommendation is an output generated by applying an algorithm (e.g., a machine learning-trained algorithm) to a set of input data. The set of input data is the particular data requested by the user.

The particular data are determined and presented to the user. The data may comprise activity data representing activities performed by the user. Such activities may include but are not limited to the user's presence at various locations, items purchased by the user, user search history, user browsing history, content consumed by the user, user interactions with content (e.g., likes associated with social media posts), content shared by the user, and voice recordings. The activity data may be presented in a timeline-based format, such as in a list ordered according to recency of the activity represented by the data.

According to some embodiments, the user may select any of the presented data and issue an instruction to make the selected data unavailable for generation of future recommendations. In response, the selected data is designated as unavailable for generation of future recommendations. Accordingly, the selected data will no longer be used as input to an algorithm for generating a recommendation for the user. This designation may be user-specific or may prohibit usage of the data to generate future recommendations for any number of users.

Embodiments may therefore efficiently allow users to control the usage of their activity data. Moreover, by allowing users to select data which will be excluded from recommendation generation, embodiments may also efficiently improve the relevance of generated recommendations to the users. Increased relevancy may result in increased user engagement and resulting transactions.

Figure 1:
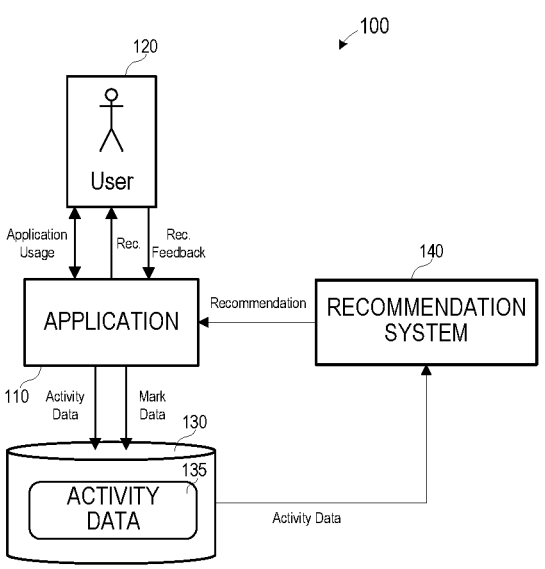
FIG. 1 is a block diagram of an architecture to manage user-related data associated with recommendations according to some embodiments.

FIG. 1 is a block diagram of an architecture of system 100 according to some embodiments. The illustrated elements of system 100 may be implemented using any suitable combination of computing hardware and/or software that is or becomes known. In some embodiments, two or more elements of system 100 are implemented by a single computing device. Two or more elements of system 100 may be co-located. One or more elements of system 100 may be implemented as a cloud service (e.g., Software-as-a-Service, Platform-as-a-Service). A cloud-based implementation of any elements of system 100 may apportion computing resources elastically according to demand, need, price, and/or any other metric.

Application 110 may be executed by an application platform comprising an on-premise, cloud-based, or hybrid hardware system providing an execution platform and services to software applications. Such an application platform may comprise one or more virtual machines executing program code of an application server. All software applications described herein may comprise program code executable by one or more processing units (e.g., Central Processing Units (CPUs), processor cores, processor threads) of an application platform to provide various functions.

Application 110 may comprise program code executable by one or more processing units to provide functions to users such as user 120 based on logic encoded within application 110 and on data stored in data store 130. Data store 130 may comprise any suitable storage system such as a database system, which may be partially or fully remote from the application platform executing application 110, and may be distributed as is known in the art.

Application 110 may provide any suitable functions to user 120. In some embodiments, application 110 provides Web searching, and data store 130 includes Web page indices and search histories of user 120 and other users. In other embodiments, application 110 is an online shopping application and data store 130 includes product-related information and user account information. In all cases, it will be assumed that application 110 collects activity data associated with interactions of user 120 with application 110 and stores the activity data in association with an identifier of user 120 within activity data 135 of data store 130.

Application 110 may be an element of a suite of applications and/or services provided by an entity. When user 120 is logged into her account with the entity, any interaction with any of the applications and/or services of the suite may be stored as activity data 135 associated with user 120.

As is known in the art, user 120 interacts with user interfaces provided by application 110. In some embodiments, such user interfaces comprise a client user interface (UI) component of software code which is downloaded to a Web browser operated by user 120 and is executed thereby. The client UI component communicates with a server UI component based on the user interactions. Accordingly, via the client UI component, application 110 may acquire data representing all user activities with respect to the user interfaces. Application 110 may store this data in activity data 135.

Recommendation system 140 may comprise any system for generating recommendations based on activity data that is or becomes known. Recommendation system 140 may be a component of application 110 or may be independently usable by application 110 and other applications. In some embodiments, and in response to a trigger or request received from application 110, recommendation system 140 may operate to receive activity data 135 associated with user 120, generate a recommendation based on the received activity data 135, and provide the recommendation to application 110. Recommendation system 140 may request only activity data 135 associated with user 120 which is suitable for use as input to the recommendation algorithm used by recommendation system 140.

Recommendation system 140 may use one or more trained models to generate a recommendation according to some embodiments. A model may comprise a network of neurons, defined by hyperparameters, which receive input, change internal state according to that input, and produce output depending on the input and internal state. The output of certain neurons is connected to the input of other neurons to form a directed and weighted graph. The weights as well as the functions that compute the internal state can be modified via training using training data as is known. Such a model may comprise any one or more types of artificial neural network that are or become known, including but not limited to convolutional neural networks, recurrent neural networks, long short-term memory networks, deep reservoir computing and deep echo state networks, deep belief networks, and deep stacking networks.

Application 110 presents the recommendation generated by recommendation system 140 to user 120. After receiving the recommendation, user 120 requests the particular activity data which was used to generate the recommendation. In some embodiments, the request is passed from application 110 to recommendation system 140, which then provides application 110 with a description of the activity data used to generate the recommendation. According to some embodiments, recommendation system 140 provides this description to application 110 along with the recommendation.

The described activity data may comprise data related to user 120 which was input to the recommendation algorithm used by recommendation system 140 to generate the recommendation. In some embodiments, the described activity data is a subset of the input activity data, such as the activity data which exhibited the most influence over generation of the recommendation. This data may be determined based on SHapley Additive exPlanations (SHAP values) or any other similar measure of the contribution of input values to the output of a trained model.

Application 110 presents the requested activity data (or descriptions thereof) to user 120. The activity data may be presented in a timeline-based format in which more recent data is listed first, in a list ordered according to contribution to the recommendation, or otherwise. User 120 may then select any of the presented data and issue an instruction to application 110 to make the selected data unavailable for generation of future recommendations. In response, application 110 marks the selected data as stored within activity data 135 as unavailable for generation of future recommendations. Marking the selected data unavailable for generation of future recommendations may also include marking similar activity data as unavailable. For example, if data representing a user visit to a website is selected, all other visits to the website are made unavailable, regardless of the time at which the website was visited.

The activity data may be presented to the user in order of relevance to the generation of the recommendation, such that activity data that is more relevant to the recommendation is listed above activity data that is less relevant to the recommendation. In other words, the activity data that was given greater weight in generation of the recommendation are listed closer to the top of presented activity list than those activity data that were given less weight in generation of the recommendation. Thus, the designation of activity data near the top of the list as unavailable is likely to have a greater impact on future recommendations, due to having been attributed greater weight in calculating the recommendation, than the designation of activity data that is lower in the list, and therefore given less weight in calculating the recommendation, as unavailable.

Thusly-designated data may be prevented from transmission to recommendation system 140 in response to a request to generate a new recommendation for user 120. In some embodiments, recommendation system 140 may request and receive activity data associated with user 120 which includes such designated activity data, but may include logic which prevents use of the designated activity data for generation of a recommendation. In some embodiments, the designated data is simply deleted from activity data 135 such that it can no longer be used for any purpose.

FIG. 2 comprises a flow diagram of process 200 to manage user-related data associated with a recommendation according to some embodiments. Portions of process 200 will be described below as if executed by application 110, but embodiments are not limited thereto.

Process 200 and all other processes mentioned herein may be embodied in executable program code read from one or more of non-transitory computer-readable media, such as, for example, a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

A recommendation is presented to a user at S210. The recommendation may have been generated based on a plurality of activity data associated with the user. In one example, activity data is provided to a recommendation system prior to S210. The activity data may include data representing activities performed by the user and detected by one or more software applications. Such activities may include but are not limited to the user's geographical position at various times, items purchased by the user, user search history, user browsing history, content consumed by the user, content posted by the user on social media, user interactions with posted content, posted content shared by the user, and audio recordings.

The recommendation system generates a recommendation by inputting the activity data to a trained machine learning algorithm. In the present example, the generated recommendation system includes one or more products and is provided to an application with which the user is currently interacting. The application presents the recommendation to the user at S210.

Figure 3A:
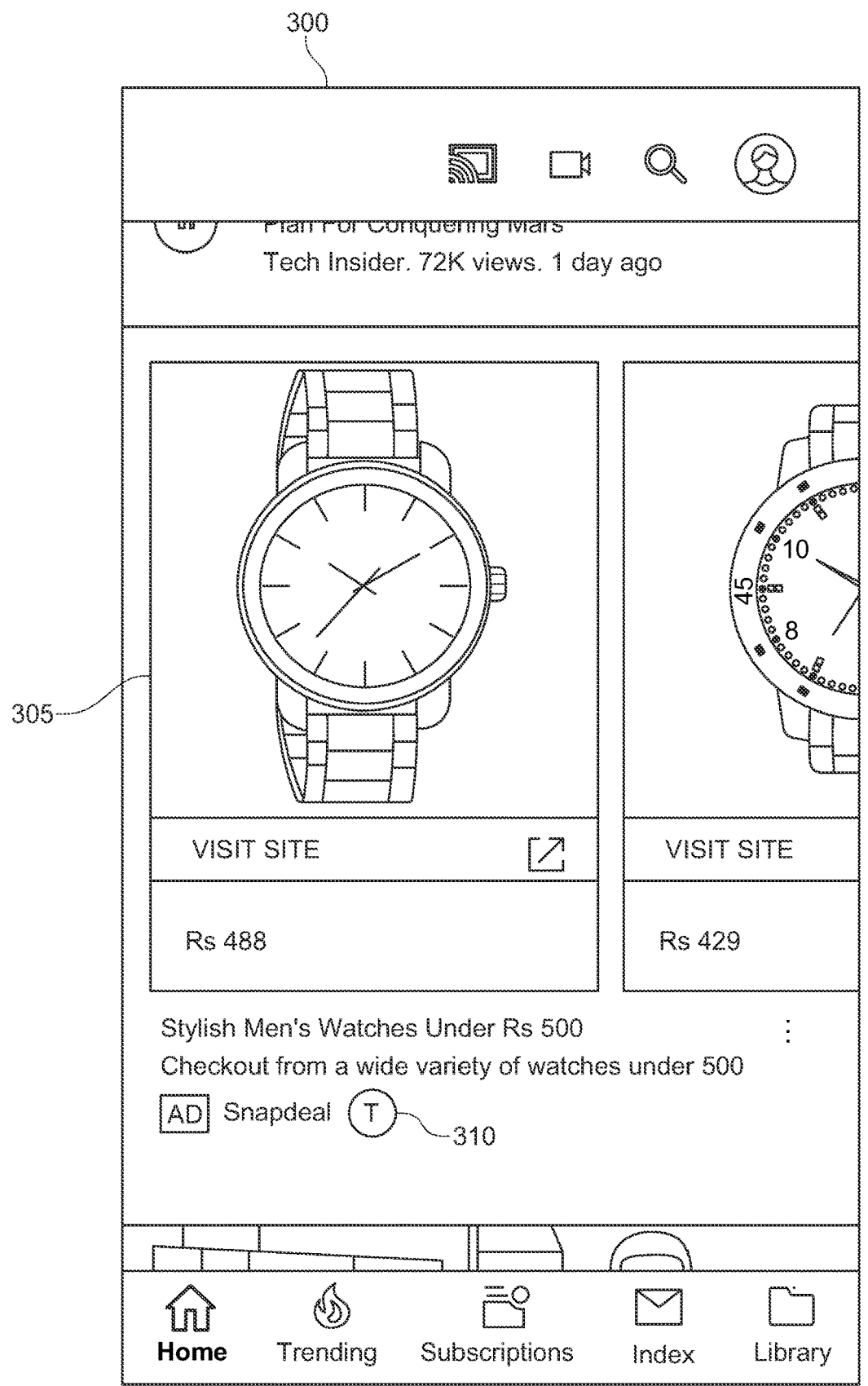
FIGS. 3A through 3D depict a user interface for managing user-related data associated with a recommendation according to some embodiments.

FIG. 3A is a view of a user interface of a mobile application presenting a recommendation at S210 according to some embodiments. User interface 300 may comprise an interface of a mobile Web browser executing on a mobile device such as a smartphone, but embodiments are not limited thereto. Embodiments are also not limited to mobile applications or to Web-related applications.

User interface 300 is a Home page presenting links to Web pages which might be of interest to the user operating the mobile device. User interface 300 also presents recommendation 305, comprising an image of wristwatches and related hyperlinks. In this regard, a recommendation may include any information which is determined by a recommendation system based on user activity data.

User interface 300 also includes icon 310. It will be assumed that the user selects icon 310, and that selection of the icon results in a request to present the plurality of activity data based on which the recommendation was generated. Embodiments are not limited to the appearance, size, position, or any other characteristic of icon 310. The request may be received by the application at S220.

In response to the request, the plurality of activity data is presented to the user at S230. S230 may therefore also comprise determination of the activity data used to generate the recommendation. In some embodiments, the recommendation system requests specific activity data prior to generating the recommendation, and the application tracks this requested data and presents the requested data to the user at S230. In other embodiments, the recommendation system determines the input activity data which exhibited the most influence over generation of the recommendation and provides this data to the application at S230.

Figure 3B:
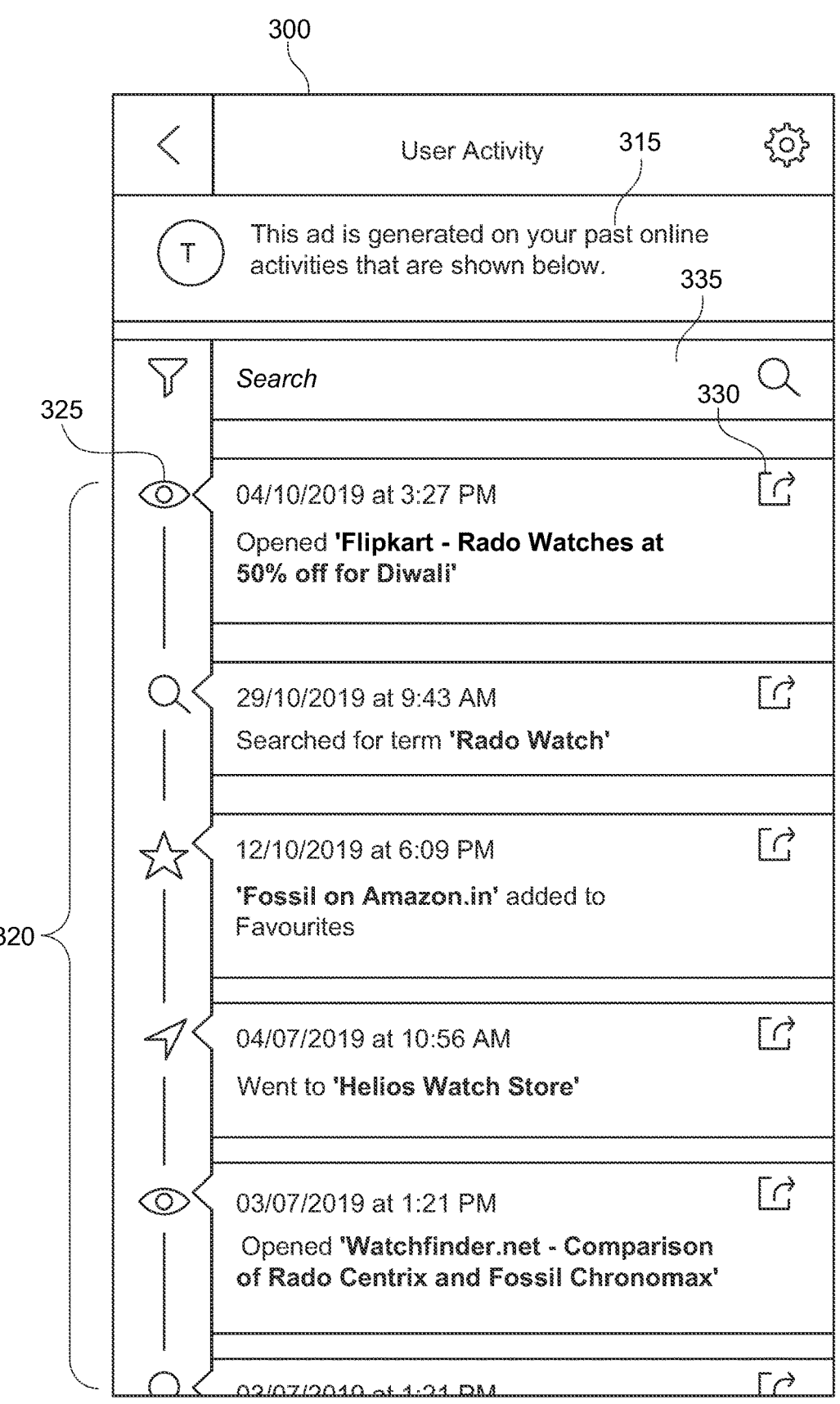

FIG. 3B illustrates user interface 300 to present activity data at S230 in response to user selection of icon 310. User interface 300 of FIG. 3B includes message 315 for providing context to displayed activity data 320. Displayed activity data 320 may comprise user-friendly descriptions of data rather than raw data generated by each activity. Each activity data 320 is associated with an icon 325 representing a type of the activity represented by the data (e.g., in descending order, a viewing activity, a searching activity, a favoriting activity, a location-related activity, and a second viewing activity). In the illustrated example, each activity data 320 is also associated with control 330 which opens a hyperlink associated with the activity data 320.

User interface 300 of FIG. 3B also includes search field 335 for searching activity data 320 based on, e.g., text, type, time. In this regard, activity data 320 is ordered chronologically, with more-recent activity data being listed first. Embodiments are not limited to the content or layout of interface 300.

Returning to process 200, a user instruction is received at S240. The user instruction is an instruction to make first activity data of the presented activity data unavailable for generation of future recommendations. Any user interface metaphor for selecting one or more of the presented activity data may be employed at S240.

Figure 3C:

According to one example, a user may invoke context menu 340 of FIG. 3C, for example by performing a long press on activity data 345. Context menu 340 includes several options, at least one of which may be determined based on the activity type of activity data 345. In particular, the option Disable Location Tracking is provided because activity data 345 is location-related. In another example, the option Delete from this Recommendation of context menu 340 removes activity data 345 from the list of activity data based on which the recommendation was generated. Accordingly, if the same recommendation is later presented to the user, activity data 345 would not be presented at S230 in response to a user request to present the activity data based on which the recommendation was generated.

Figure 3D:
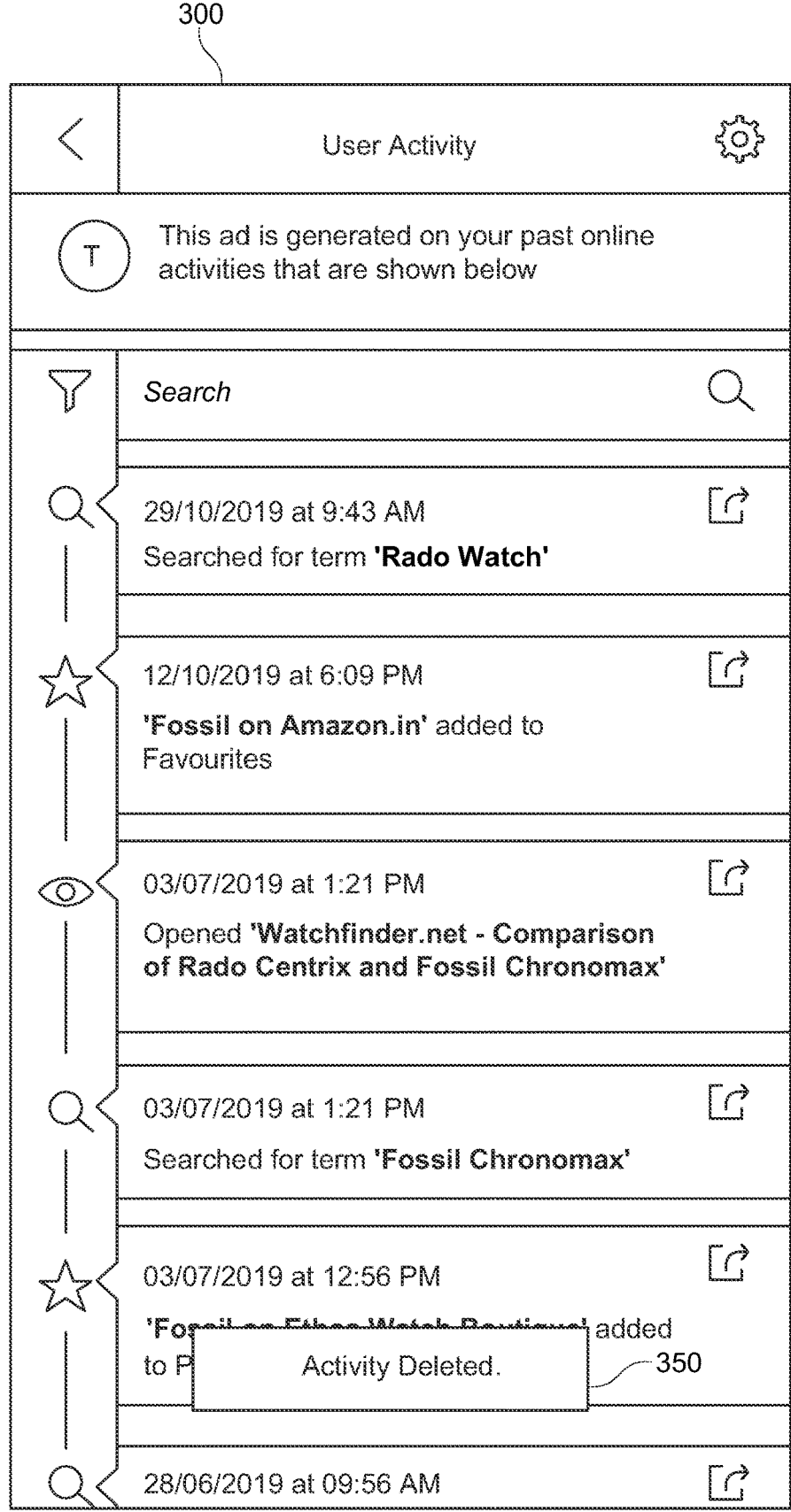

In the present example, selection of the Delete Activity option of menu 340 comprises the user instruction to make activity data 345 unavailable for generation of future recommendations. Some embodiments include user interface controls (e.g., checkboxes) which facilitate the selection of more than one of the presented activity data at S240. In response to the user instruction, the selected activity data is designated as unavailable for generation of future recommendations at S250. Accordingly, the selected data will not be used as input to generate a future recommendation. FIG. 3D shows user interface after S250 according to some embodiments. Message 350 confirms deletion of the activity.

The designation at S250 may comprise marking the selected data within a data store as unavailable for generation of future recommendations, for example by setting an associated flag. Thusly-designated data may be prevented from transmission to a requesting recommendation system. In some embodiments, the designated data may be provided to a recommendation system upon request, but the recommendation system will note the designation and not use the associated data to generate a recommendation. In some embodiments, the designated data is deleted from the data store in which it is stored such that it can no longer be used for any purpose.

According to some embodiments, S250 is followed by automatic (i.e., without further user input) generation and presentation of a new recommendation. The recommendation is generated without consideration of the data which was designated as unavailable at S250.

Figure 4:
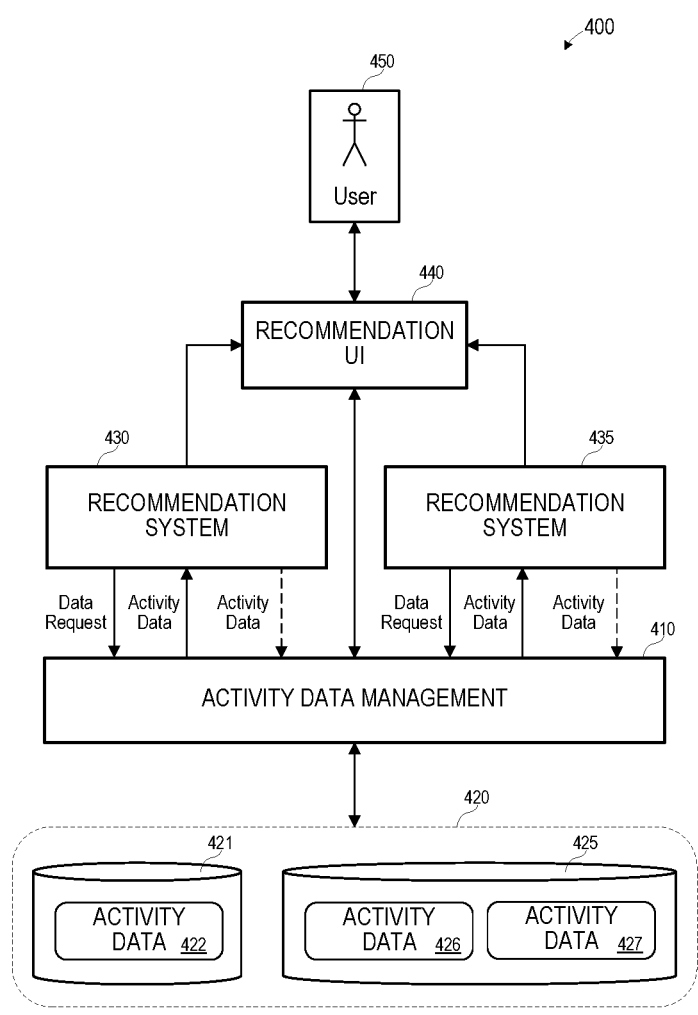
FIG. 4 is a block diagram of an architecture to manage user-related data associated with recommendations provided by multiple recommendation systems according to some embodiments.

FIG. 4 is a view of architecture 400 according to some embodiments. Architecture 400 includes activity data management component 410 for performing many of the functions described herein. In some embodiments, activity data management component 410 implements process 200 of FIG. 2.

Architecture 400 includes activity data storage 420 which is accessible to activity data management component 410. Activity data storage 420 includes data store 421 and data store 425, in order to indicate that activity data storage 420 may comprise any number of disparate storage systems. Each of data store 421 and data store 425, in turn, may include activity data generated by any number of disparate applications and/or services, e.g., activity data 422, activity data 426 and activity data 427. As mentioned earlier, the various types of activity data includes, but is not limited to, user's presence at various locations, items purchased by the user, user search history (either on the Internet overall or a search on a particular website such as an ecommerce website), user browsing history, content consumed by the user, user interactions with content (e.g., likes associated with social media posts), content shared by the user, and voice recordings.

Architecture 400 also includes recommendation system 430 and recommendation system 435, but embodiments are not limited to two recommendation systems. As will be described below, activity data management component 410 may operate to provide activity data to each of recommendation system 430 and recommendation system 435 on request. Activity data management component 410 may also receive, from recommendation system 430 and recommendation system 435, indications of activity data which was used to generate recommendations.

Such recommendations may be provided to recommendation UI 440 for presentation to user 450. Recommendation UI 440 may also receive requests from user 450 to present activity data which was used to generate the presented recommendations. These requests may be received by activity data management component 410, which provides the requested activity data to recommendation UI 440. Activity data management component 410 may also receive user requests from recommendation UI 440 to make selected activity data unavailable for generation of future recommendations, and may modify corresponding activity data stored in activity data storage 420 in response.

According to some embodiments, architecture 400 provides applications with a framework to provide recommendations and user management of activity data. For example, applications (not shown) may utilize or otherwise incorporate recommendation UI 440 into their respective user interfaces to selectively provide recommendations from recommendation systems 430 and/or 435 to users of the applications. The users may, in turn, input requests to recommendation UI 440 to make selected activity data unavailable for use in generating future recommendations, and those requests may be served by activity data management component 410 as described herein.

Figure 5:
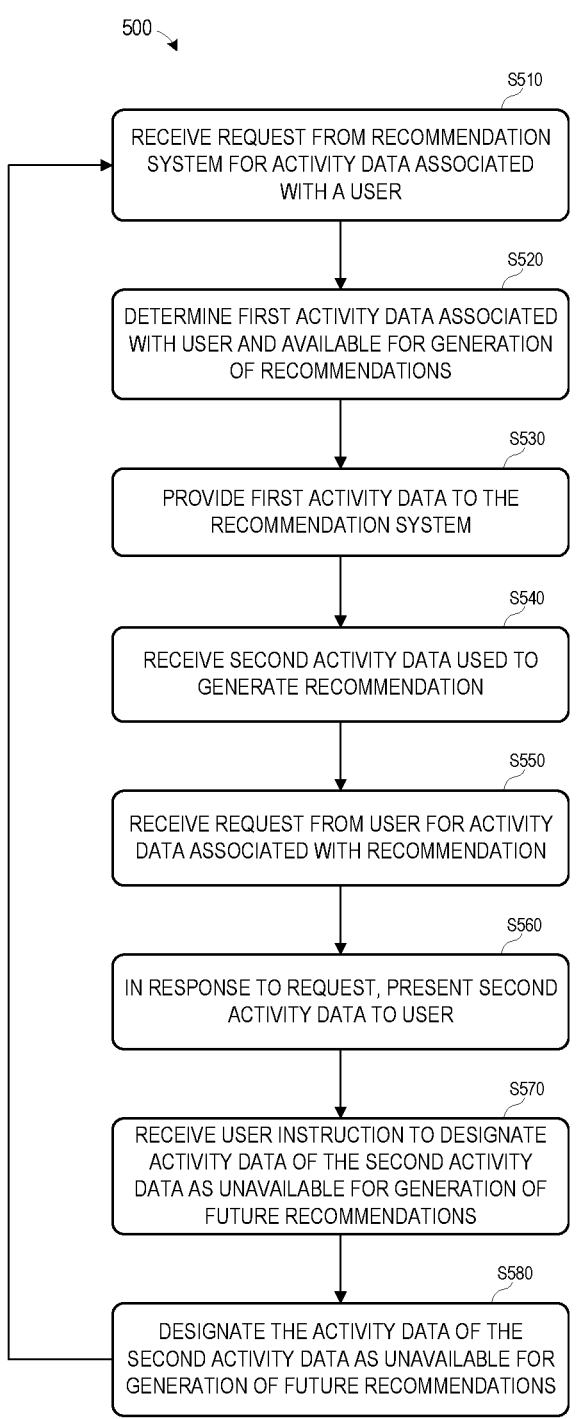
FIG. 5 is a flow diagram of a process to provide a recommendation and manage user-related data associated with the recommendation according to some embodiments.

FIG. 5 is a flow diagram of process 500 to provide a recommendation and manage user-related data associated with the recommendation according to some embodiments. Process 500 may be performed by activity data management component 410 but embodiments are not limited thereto.

At S510, a request is received from a recommendation system for activity data associated with a user. In one example of S510, an application being used by a user asks a recommendation system to provide a recommendation for the user. The recommendation system may be a component of the application or provided by a third party and accessible to the application. With respect to architecture 400, the request may be received at S510 by activity data management component 410 from recommendation system 430.

At S520, first activity data associated with the user is determined. The determined first activity data is available for generation of recommendations. For example, activity data management component 410 may query activity data storage 420 at S520 for activity data which is associated with the user and which has not been designated as unavailable for generation of recommendations as described herein. It should be noted that activity data 422, 426 and 427 may be maintained by a single entity or a plurality of entities such that the query to data storage 420 could encompass data stored by many different entities in several locations. The query may include any other suitable filtering specified by the recommendation system and/or by activity data management component 410. In some embodiments, the requested activity data may be associated with a particular timeframe (e.g., a most recent three-month period), a particular activity data type (e.g., only shopping-related data), and/or any other combination of filters.

The first activity data is provided to the recommendation system at S530. Activity data management component 410 may maintain a record of the activity data provided to the recommendation system for a given recommendation according to some embodiments.

It will be assumed that the recommendation system generates a recommendation based on the first activity data and provides the recommendation to the user. At S540, second activity data which was used to generate the recommendation is received from the recommendation system. The second activity data may comprise a subset of the first activity data provided to the recommendation system. The second activity data may comprise activity data which was determined by the recommendation system to have the most influence in generating the recommendation. In alternative implementations, the second activity data may merely be references to select activity data of the first activity data which the recommendation system determined to have the most influence in generating the recommendation.

At S550, a request is received from the user (e.g., via recommendation UI 440) for activity data associated with the recommendation. In response to the request, the second activity data is presented to the user at S560. For example, activity data management component 410 may present to the user, via recommendation UI 440, the second activity data received from the recommendation system at S540. Alternatively, activity management component 410 may use the second activity data to retrieve copies of the subset of first activity data that were most influential in generation of the recommendation from data store 420.

Next, a user instruction is received at S570. The user instruction may comprise an instruction to designate activity data of the second activity data as unavailable for generation of future recommendations. In this regard, recommendation UI 440 may provide UI controls which are manipulable by the user to select a subset of the presented second activity data and to issue the user instruction of S570.

The selected activity data is designated as unavailable for generation of future recommendations at S580. The designation at S580 may comprise marking the selected data within data storage 420 as unavailable for generation of future recommendations, for example by setting an associated flag. Designating the selected data as unavailable at S580 may also include identifying similar stored activity data which might not have been used to generate the recommendation and designating thusly-identified activity data as unavailable.

The designated data may be prevented from transmission to a requesting recommendation system. In some embodiments, the designated data may be provided to a recommendation system upon request, but the recommendation system will note the designation and not use the associated data to generate a recommendation. In some embodiments, the designated data is deleted from data store 420 such that it can no longer be used for any purpose.

Flow may then return to S510 and continue as described above. Regardless of whether the selected activity data is designated as unavailable by marking or deleting as described above, in some embodiments a new recommendation is automatically generated after S580 and presented to the user, prior to returning to S510.

Figure 6:
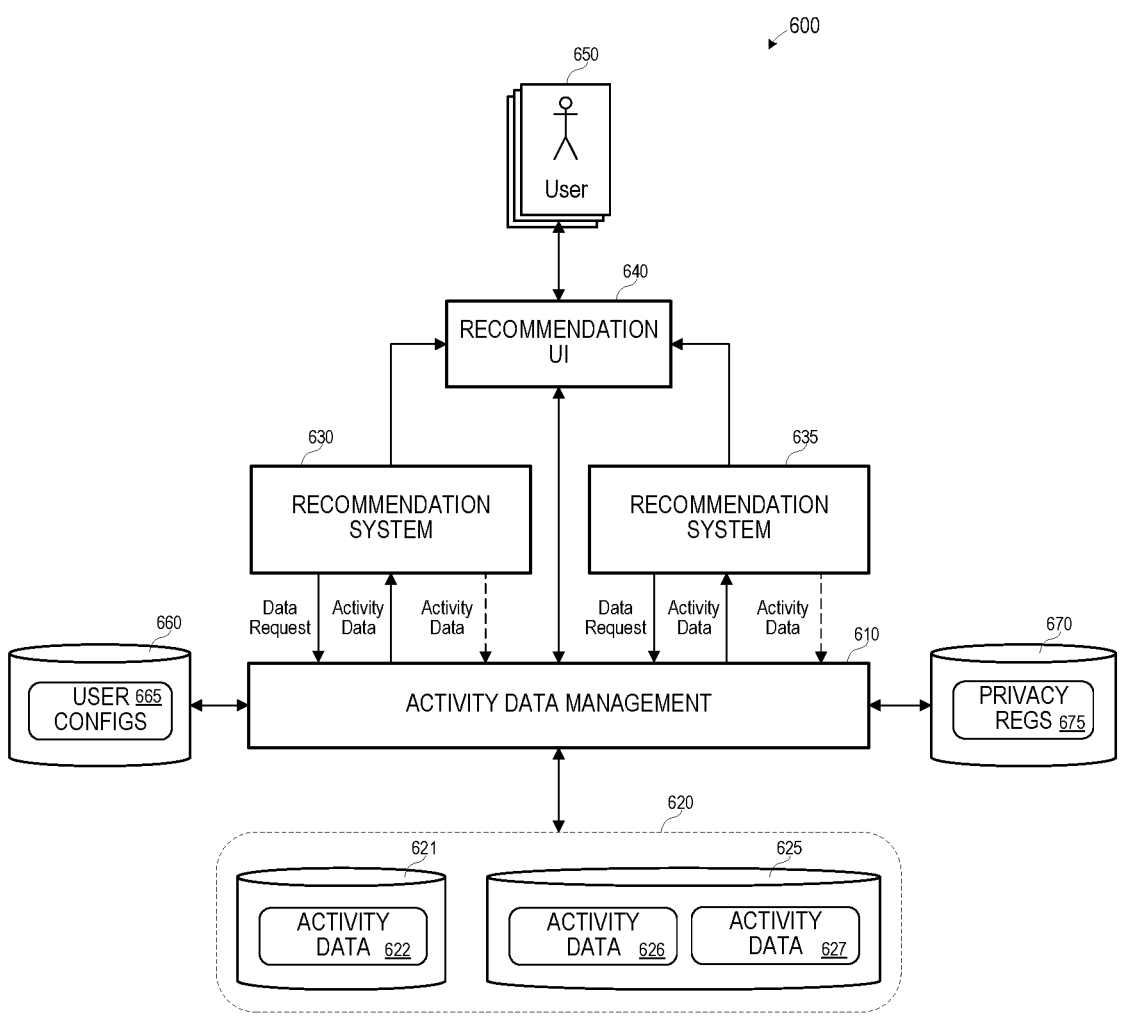
FIG. 6 is a block diagram of an architecture to manage user-related data associated with recommendations provided by multiple recommendation systems to multiple users according to some embodiments.

FIG. 6 is a block diagram of architecture 600 to manage user-related data associated with recommendations provided by multiple recommendation systems to multiple users according to some embodiments.

Architecture 600 includes activity data management component 610, data storage 620, recommendation systems 630 and 635 and recommendation UI 640, which may be implemented similarly to correspondingly-named components of architecture 400. Activity data management component 610 may implement process 200 and/or process 500 as described above.

Data stores 621 and 625 of activity data storage 620 may include activity data generated by any number of disparate applications and/or services. The activity data may be associated with any number of respective users 650. In this regard, configuration store 660 stores user configurations 665 associated with various users 650. Each user configuration 665 may specify, for a particular user, locations of activity data for the user within data storage 620, one or more recommendation systems from which the user may receive recommendations, identifiers of activity data which has been designated by the user as unavailable for generation of recommendations, and data access restrictions specified by or otherwise associated with the user.

The data access restrictions may indicate activity data which should not be provided to a recommendation system, based on, e.g., the particular application which generated the activity data, the type of activity data, and the location of the user. In the latter regard, architecture 600 also includes regulation store 670 storing data privacy regulations 675. For example, a user configuration 665 may indicate that a user is located in the European Union (EU) and activity data management component 610 may therefore only provide activity data of the user to recommendation systems in compliance with EU privacy regulations specified in data privacy regulations 675. A user configuration 665 may specify any one or more of data privacy regulations 675 to be enforced by activity data management component 610 when providing activity data to a recommendation system.

Figure 7:
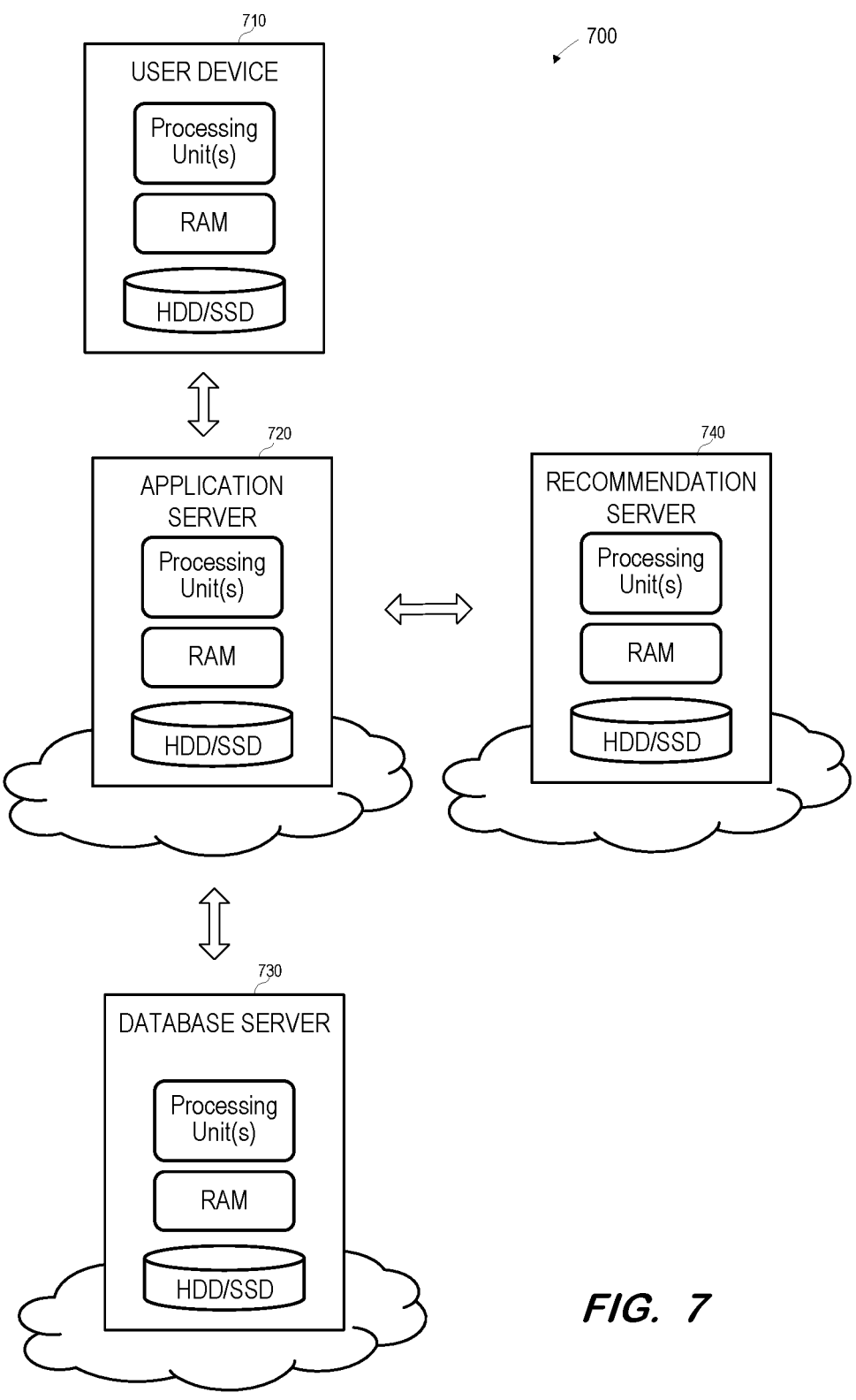
FIG. 7 is a block diagram of a cloud-based system to manage user-related data associated with recommendations according to some embodiments.

FIG. 7 illustrates cloud-based database deployment 700 according to some embodiments. In this regard, application server 720, database server 730 and recommendation server 740 may comprise cloud-based compute resources, such as virtual machines, allocated by a public cloud provider providing self-service and immediate provisioning, autoscaling, security, compliance and identity management features.

User device 710 may issue requests to applications executing on application server 720, for example via a Web Browser executing on user device 710. The requests may result in storage of activity data within a database provided by database server 720. The application may provide activity data to recommendation server 740, which generates a recommendation based thereon. The recommendation is then provided to a user via user device 710.

The user may request activity data which was used to generate the recommendation, and the requested activity data is presented to the user in response as described herein. The user may then indicate some or all of the presented activity data which should not be used to generate future recommendations. In response, application server 720 and/or recommendation server 740 may designate the indicated data as such as described herein.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of some embodiments may include a programmable processing unit to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:

at least one processing unit; and a non-transitory machine-readable medium storing program code that, when executed by the at least one processing unit, causes the at least one processing unit to perform operations comprising:

receiving a request for a recommendation from a user;

in response to the request, inputting a first plurality of activity data associated with the user to a machine learning system;

receiving, from the machine learning system and in response to the input first plurality of activity data, a first recommendation associated with the user;

presenting the first recommendation to the user;

receiving a first user request to present activity data based on which the first recommendation was generated;

in response to the first user request, presenting the first plurality of activity data to the user;

receiving an instruction from the user to remove a first portion of the first plurality of the activity data from the first plurality of activity data presented to the user for the first recommendation;

receiving a second request for a second recommendation from the user;

in response to the second request, inputting the first plurality of activity data to the machine learning system;

receiving, from the machine learning system and in response to the input first plurality of activity data, a second instance of the first recommendation presenting the second instance of the first recommendation to the user;

receiving a second user request to present activity data based on which the second instance of the first recommendation was generated; and in response to the second user request, presenting the first plurality of activity data and not the first portion of the first plurality of the activity data to the user.

2. A system according to claim 1, wherein the first plurality of activity data is presented to the user in order of relevance of the activity data to the generation of the first recommendation, wherein activity data that was given greater weight in generating the first recommendation is presented differently to the user than activity data that was given lower weight in generating the first recommendation.

3. A system according to claim 1, wherein the program code, when executed by the at least one processing unit, causes the at least one processing unit to perform operations comprising:

receiving a request from the machine learning system for activity data associated with the user; and identifying the first plurality of activity data associated with the user and a second plurality of activity data associated with the user and designated as unavailable for generation of recommendations for the user.

4. A system according to claim 1, wherein the program code, when executed by the at least one processing unit, causes the at least one processing unit to perform operations comprising:

receiving a request from a machine learning system for activity data associated with the user;

identifying a second plurality of activity data associated with the user;

providing the second plurality of activity data to the machine learning system; and receiving the first plurality of activity data from the machine learning system, the first plurality of activity data associated with the recommendation and comprising a subset of the second plurality of data.

5. A system according to claim 1, wherein the first plurality of activity data comprises at least one of the following types of activity data: location history of the user, items purchased by the user, a search history of the user, a browsing history of the user, content consumed by the user, and content shared by the user.

6. A system according to claim 5, wherein the first portion of the first plurality of activity data is of a first type, and wherein the program code, when executed by the at least one processing unit, causes the at least one processing unit to perform operations comprising:

identifying a third portion of the first plurality of activity data is of the first type; and designating the third portion of the first plurality of the activity data as unavailable for generation of recommendations.

7. A method comprising:

receiving a request for a recommendation from a user;

in response to the request, inputting a first plurality of activity data associated with the user to a machine learning system;

receiving, from the machine learning system and in response to the input first plurality of activity data, a first recommendation associated with the user;

presenting the first recommendation to the user;

receiving a first user request to present activity data based on which the first recommendation was generated;

in response to the first user request, presenting the first plurality of activity data to the user;

receiving an instruction from the user to remove a first portion of the first plurality of the activity data from the first plurality of activity data presented to the user for the first recommendation;

receiving a second request for a second recommendation from the user;

in response to the second request, inputting the first plurality of activity data to the machine learning system;

receiving, from the machine learning system and in response to the input first plurality of activity data, a second instance of the first recommendation;

presenting the second instance of the first recommendation to the user;

receiving a second user request to present activity data based on which the second instance of the first recommendation was generated; and in response to the second user request, presenting the first plurality of activity data and not the first portion of the first plurality of the activity data to the user.

8. A method according to claim 7, wherein the first plurality of activity data is presented to the user in order of relevance of the activity data to the generation of the first recommendation, wherein activity data that was given greater weight in generating the first recommendation is presented differently to the user than activity data that was given lower weight in generating the first recommendation.

9. A method according to claim 7, the method further comprising:

receiving a request from the machine learning system for activity data associated with the user; and identifying the first plurality of activity data associated with the user and a second plurality of activity data associated with the user and designated as unavailable for generation of recommendations for the user.

10. A method according to claim 7, the method further comprising:

receiving a request from a machine learning system for activity data associated with the user;

identifying a second plurality of activity data associated with the user;

providing the second plurality of activity data to the machine learning system; and receiving the first plurality of activity data from the machine learning system, the first plurality of activity data associated with the recommendation and comprising a subset of the second plurality of data.

11. A method according to claim 7, wherein the first plurality of activity data comprises at least one of the following types of activity data: a location history of the user, items purchased by the user, a search history of the user, a browsing history of the user, content consumed by the user, and content shared by the user.

12. A method according to claim 11, wherein the first portion of the first plurality of activity data is of a first type, and wherein the program code, when executed by the at least one processing unit, causes the at least one processing unit to perform operations comprising:

identifying a third portion of the first plurality of activity data is of the first type; and designating the third portion of the first plurality of the activity data as unavailable for generation of recommendation.

13. A non-transitory medium storing processor-executable program code executable by a processing unit of a computing system to cause the computing system to:

receive a request for a recommendation from a user;

in response to the request, input a first plurality of activity data associated with the user to a machine learning system;

receive, from the machine learning system and in response to the input first plurality of activity data, a first recommendation associated with the user;

present the first recommendation to the user;

receive a first user request to present activity data based on which the first recommendation was generated;

in response to the first user request, present the first plurality of activity data to the user;

receive an instruction from the user to remove a first portion of the first plurality of the activity data from the first plurality of activity data presented to the user for the first recommendation;

receive a second request for a second recommendation from the user;

in response to the second request, input the first plurality of activity data to the machine learning system;

receive, from the machine learning system and in response to the input first plurality of activity data, a second instance of the first recommendation;

present the second instance of the first recommendation to the user;

receive a second user request to present activity data based on which the second instance of the first recommendation was generated; and in response to the second user request, present the first plurality of activity data and not the first portion of the first plurality of the activity data to the user.

14. A non-transitory medium according to claim 13, wherein the first plurality of activity data is presented to the user in order of relevance of the activity data to the generation of the first recommendation, wherein activity data that was given greater weight in generating the first recommendation is presented differently to the user than activity data that was given lower weight in generating the first recommendation.

15. A non-transitory medium according to claim 13, the processor-executable program code executable by a processing unit of a computing system to cause the computing system to:

receive a request from the machine learning system for activity data associated with the user; and identify the first plurality of activity data associated with the user and a second plurality of activity data associated with the user and designated as unavailable for generation of recommendations for the user.

16. A non-transitory medium according to claim 13, the processor-executable program code executable by a processing unit of a computing system to cause the computing system to:

receive a request from a machine learning system for activity data associated with the user;

identify a second plurality of activity data associated with the user;

provide the second plurality of activity data to the machine learning system; and receive the first plurality of activity data from the machine learning system, the first plurality of activity data associated with the recommendation and comprising a subset of the second plurality of data.

17. A non-transitory medium according to claim 13, wherein the first plurality of activity data comprises at least one of the following types of activity data: a location history of the user, items purchased by the user, a search history of the user, a browsing history of the user, content consumed by the user, and content shared by the user, and wherein the first portion of the first plurality of activity data is of a first type, the processor-executable program code executable by a processing unit of a computing system to cause the computing system to:

identify a third portion of the first plurality of activity data is of the first type; and designate the third portion of the first plurality of the activity data as unavailable for generation of recommendations.

* * * * *